(12) United States Patent
Dackermann et al.

(10) Patent No.: US 10,118,599 B2
(45) Date of Patent: Nov. 6, 2018

(54) METHOD FOR DISTRIBUTING A BRAKE FORCE, AND BRAKING DEVICE

(71) Applicant: Robert Bosch GmbH, Stuttgart (DE)

(72) Inventors: Tim Dackermann, Tuebingen (DE); Rinaldo Greiner, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 78 days.

(21) Appl. No.: 15/308,754

(22) PCT Filed: Apr. 9, 2015

(86) PCT No.: PCT/EP2015/057705
§ 371 (c)(1),
(2) Date: Nov. 3, 2016

(87) PCT Pub. No.: WO2015/185248
PCT Pub. Date: Dec. 10, 2015

(65) Prior Publication Data
US 2017/0182986 A1 Jun. 29, 2017

(30) Foreign Application Priority Data
Jun. 3, 2014 (DE) .................. 10 2014 210 382

(51) Int. Cl.
*B60T 8/17* (2006.01)
*B60T 8/26* (2006.01)
(Continued)

(52) U.S. Cl.
CPC .............. *B60T 8/261* (2013.01); *B60T 8/171* (2013.01); *B60T 8/1706* (2013.01);
(Continued)

(58) Field of Classification Search
CPC ...... B60T 8/3225; B60T 8/1706; B60T 8/261; B60T 8/1766; B60T 8/4072;
(Continued)

(56) References Cited

U.S. PATENT DOCUMENTS 4,494,800 A   1/1985  Hayashi
4,626,042 A * 12/1986  Burckhardt ........... B60T 8/1706
                                                    303/137

(Continued)

FOREIGN PATENT DOCUMENTS

DE    10011375 A1    9/2000
DE    10158382 A1    6/2003
(Continued)

OTHER PUBLICATIONS

International Search Report dated Nov. 25, 2015, of the corresponding application PCT/EP2015/057705 filed Apr. 9, 2015.

*Primary Examiner* — Bradley T King
*Assistant Examiner* — Mahbubur Rashid
(74) *Attorney, Agent, or Firm* — Norton Rose Fulbright US LLP; Gerard Messina

(57) ABSTRACT

A method for braking a vehicle which is operable by a motor or by muscular power, in particular an electric bicycle. During a braking operation, a brake force influencing device is controlled by an electric brake pressure control device, and the brake pressure for the front wheel brake and/or for the rear wheel brake, and thus the brake force thereof, is increased and/or decreased. The brake pressure control device receives brake pressure signals in each case from a brake actuation detector for the front wheel brake and for the rear wheel brake, and an improved distribution of a total brake force on the front wheel and the rear wheel is effectuated which differs from the distribution that is effectuated by the driver.

14 Claims, 6 Drawing Sheets

(51) Int. Cl.
  *B62L 3/08* (2006.01)
  *B60T 8/1766* (2006.01)
  *B60T 8/32* (2006.01)
  *B60T 8/42* (2006.01)
  *B62L 3/02* (2006.01)
  *B60T 8/171* (2006.01)
  *B60T 8/34* (2006.01)
  *B60T 13/16* (2006.01)

(52) U.S. Cl.
  CPC .......... *B60T 8/1766* (2013.01); *B60T 8/3225* (2013.01); *B60T 8/341* (2013.01); *B60T 8/4266* (2013.01); *B60T 13/16* (2013.01); *B62L 3/023* (2013.01); *B62L 3/08* (2013.01)

(58) Field of Classification Search
  CPC ........ B60T 8/4266; B60T 7/042; B60T 7/085; B60T 8/171; B60T 8/50; B60T 8/5093; B62L 3/08; B62L 3/023
  USPC .......................................................... 303/137
  See application file for complete search history.

(56) References Cited

U.S. PATENT DOCUMENTS

| | | | | |
|---|---|---|---|---|
| 5,372,408 | A * | 12/1994 | Tsuchida | B60T 8/261 303/9.61 |
| 5,620,237 | A * | 4/1997 | Iwashita | B60T 8/261 188/106 P |
| 6,409,285 | B1 * | 6/2002 | Wakabayashi | B60T 8/261 303/137 |
| 6,557,949 | B2 * | 5/2003 | Tani | B60T 8/1706 303/114.2 |
| 6,601,927 | B2 * | 8/2003 | Sakamoto | B60T 8/1706 303/137 |
| 7,219,965 | B2 * | 5/2007 | Wagner | B60T 8/1706 303/137 |
| 7,347,508 | B2 * | 3/2008 | Nakayama | B60T 7/04 303/137 |
| 7,794,026 | B2 * | 9/2010 | Nakayama | B60T 8/1706 303/113.1 |
| 8,132,866 | B2 * | 3/2012 | Tsuruhara | B60T 8/3225 303/116.1 |
| 8,287,053 | B2 * | 10/2012 | Tahara | B60T 7/042 180/219 |
| 8,328,295 | B2 * | 12/2012 | Westerfeld | B60T 8/1706 303/137 |
| 9,358,965 | B2 * | 6/2016 | Nishikawa | B60T 7/042 |
| 2004/0046444 | A1 * | 3/2004 | Heubner | B60T 8/1706 303/113.5 |
| 2006/0028064 | A1 * | 2/2006 | Beulich | B60T 8/1706 303/137 |
| 2006/0220450 | A1 * | 10/2006 | Koyama | B60T 8/1706 303/113.4 |
| 2011/0043031 | A1 * | 2/2011 | Nishikawa | B60T 8/1706 303/137 |
| 2012/0211295 | A1 * | 8/2012 | Nagai | B60T 8/3225 180/219 |
| 2013/0030649 | A1 * | 1/2013 | Matsuda | B60T 8/1706 701/38 |

FOREIGN PATENT DOCUMENTS

| | | |
|---|---|---|
| DE | 10307339 A1 | 9/2004 |
| DE | 102010038525 A1 | 2/2012 |
| DE | 102010049474 A1 | 5/2012 |
| EP | 2311700 A1 | 4/2011 |
| JP | H07112626 A | 5/1995 |
| JP | 2005212680 A | 8/2005 |
| JP | 2013032052 A | 2/2013 |

\* cited by examiner

METHOD FOR DISTRIBUTING A BRAKE FORCE, AND BRAKING DEVICE

BACKGROUND INFORMATION

The present invention relates to a method for braking a vehicle which is operable by a motor or by muscular power, in particular an electric bicycle. Such a vehicle includes a hydraulic front wheel brake and a hydraulic rear wheel brake, each of which is separately actuatable by a driver. The brake pressure effectuated at the front wheel brake or the rear wheel brake may be changed with the aid of an electrohydraulic brake force influencing device, in that the latter is controlled by an electrical brake pressure control device. The brake pressure at the front wheel brake and/or rear wheel brake, and thus also the brake force, may be increased and/or decreased in this way.

In another aspect, the present invention relates to an electrohydraulic braking device which includes a hydraulic front wheel brake and a hydraulic rear wheel brake, as well as a separate brake actuating device for each of these two brakes. The braking device also includes an electrohydraulic brake force influencing device for increasing and/or decreasing a brake pressure of the front wheel brake and/or a brake pressure of the rear wheel brake, and thus for increasing or decreasing the brake force thereof. In addition, the braking device includes an electrical brake pressure control device, with the aid of which the brake force influencing device is controllable.

Conventional antilock braking systems (ABS systems) for two-wheel and multi-wheel vehicles include wheel sensors via which the movement of a wheel may be detected. Based on these measurements, the ABS system may determine whether or not a wheel is locked during braking, and may thus control the braking operation in such a way that the friction state between the tires and the base surface ranges at the limit between rolling friction and sliding friction. This control is typically carried out for each wheel individually. For this purpose, the brake pressure for the individual wheel brakes is adjusted with the aid of a brake pressure control device.

An ABS system, preferably for a bicycle, is described in German Patent No. DE 10158382 A1, for example.

German Patent Application No. DE 102010049474 A1 describes a hydraulic braking system having an antilock braking function, preferably for motorcycles, mopeds, and vehicles without an independent drive. A hydraulic system including a hydraulic pump is provided which implements the antilock braking function via a hydraulic circuit.

German Patent Application No. DE 102010038525 A1 describes a braking device having active brake force limiting, and a two-wheeled vehicle which includes such a braking device. A piezo stack is integrated into the hydraulic line of the braking device. By activating the piezo stack, it may expand or contract, causing the volume in the line of the braking device to increase or decrease. In this way, the known ABS behavior of a passenger vehicle may be achieved in a bicycle, for example.

In addition, a conventional braking system for motorcycles includes a first of two brake actuating devices acting on the front wheel and also on the rear wheel. The second braking device acts only on the front wheel. The first braking device is designed in such a way that when it is actuated, a brake pressure which is suitable for a typical normal case is directed to the front wheel brake and to the rear wheel brake. The second braking device for the front wheel is intended as an auxiliary brake for emergencies or special driving situations, such as traveling with a pillion rider or traveling on a steep downhill grade, for which an increased brake force on the front wheel is necessary. This system was developed in the 1970s by the Italian motorcycle manufacturer Moto Guzzi, and is a purely hydraulic system.

SUMMARY

The present invention relates to a method for braking a vehicle, in which the brake pressure control device receives brake pressure signals in each case from a brake actuation detector for the front wheel and for the rear wheel. The brake is actuated by the driver. This often results in an unfavorable distribution of the brake forces on the front wheel and the rear wheel. According to the method, an improved distribution of the total brake force on the front wheel and the rear wheel is effectuated with the aid of the brake pressure control device. This improved distribution differs from the distribution that is effectuated by the driver. In the ideal case, very experienced drivers themselves may optimally distribute the brake forces on the front wheel and rear wheel in order to achieve a preferably short but comfortable braking distance. If the driver does not have this level of experience, this may be remedied by the present invention.

In particular, the evaluation device ascertains whether a braking intent is present when an increase in brake pressure is detected. The evaluation device classifies the situation as a hazardous situation when a brake pressure rises particularly sharply or rises once again in the course of a braking operation. The brake pressure control device may also respond differently to a hazardous situation compared to a normal braking situation. In particular, in a hazardous situation, the brake force may be increased beyond the force effectuated by the driver, preferably up to maximum capacity utilization of the front wheel brake or rear wheel brake. At the same time, an ABS function, if available, may become active.

In particular, the control device compares the brake pressures generated by the driver, and ascertains with the aid of a function or from a table the distribution of the brake force to be set on the front wheel and rear wheel. Depending on the result of this ascertainment, the electrohydraulic brake force influencing device, which sets the ascertained pressure at the front wheel and rear wheel brakes, is controlled. For this purpose, the pressure may be decreased via a particular valve and/or increased via a particular electrohydraulically controlled pressure generator.

One advantage of the present invention is that the wear on the brakes and tires is optimized. A suitable distribution on the front wheel and rear wheel brakes distributes the brake forces better, so that overall less wear results. In particular, tire wear due to locking is also prevented. If an ABS system is additionally present which would intervene for an individual wheel, with the provided method it is often possible to avoid ABS intervention in many critical situations. A further advantage is that the braking distance is reduced due to the improved distribution of the brake forces on the front and rear wheels. Hazardous situations may be mitigated in this way.

Preferred refinements of the present invention are described herein.

In one specific embodiment of the method, the distribution of the total brake force is carried out based on stored information. This information may be stored in the brake pressure control device. This information preferably represents values of a table, or parameters of a function for ascertaining the distribution of the brake forces.

In another specific embodiment of the method, in the distribution of the total brake force, in addition to the information of the brake actuation detection means, information from additional sensors is taken into account in order to achieve an improved distribution of the brake forces. For example, the brake force may be distributed more heavily on the front wheel as a function of a braking acceleration or a downhill grade, or for an uphill grade more brake force may be distributed on a rear wheel. A hazardous situation, for example particularly high braking accelerations, high rotation rates, or a sharp reduction in speed may be recognized based on information from sensors. Based on the acceleration, it may also be determined whether the driver has a braking intent, for example when the driver decelerates the vehicle with the aid of the brake or other methods such as an engine brake or driving-related braking maneuvers. The particular driving situation a vehicle is in, for example whether it is negotiating a curve, may be taken into account in the distribution of the brake forces. For this purpose, the dynamics of the vehicle may be taken into account, for example by ascertaining the driving state based on information from sensors such as a rotation rate sensor and/or a speed sensor and/or an acceleration sensor. In principle, multiple signals of various sensors may be redundantly used for ascertaining the brake force distribution as well as for ascertaining a driving state of the vehicle.

The distribution of a total brake force on the front wheel and the rear wheel may include also changing the total brake force. For example, in a hazardous situation the total brake force may be significantly increased.

In another specific embodiment of the method, it is provided to divide the braking operation into multiple stages, each regarding the manner in which the brake pressure is influenced with the aid of the brake force influencing device. In a first stage, no intervention in the braking operation is made; i.e., the braking operation is carried out in the manner specified by the driver by his/her braking behavior. In a second stage, the brake pressure generated by the driver is slightly changed with the aid of the brake force influencing device. An average intensity of influencing takes place in the third stage, and a high intensity of influencing the brake pressure takes place in the fourth stage with the aid of the brake force influencing device. In a fifth stage, the brake pressure is held constant, regardless of which brake pressure the driver would like to effectuate, which represents the most intense influencing. The mentioned stages do not all have to be carried out in the method, and their sequence may also be arbitrary. In this way, the method may be adapted to the particular situation. Whether a hazardous situation or a normal braking situation is present in particular plays a role. The transition from a normal braking situation to a hazardous situation may be quantified and associated with the stages, so that the more hazardous an occurring situation is estimated to be, the more intense the influencing of the brake pressure that takes place. For example, the degree of hazard may be made a function of the intensity of the brake pressure which the driver generates by actuating the brake. Alternatively or additionally, information from additional sensors may be used for estimating the degree of hazard. It is possible, for example with the aid of a wheel motion sensor, to detect whether, and how intensely, a braking operation has been initiated. Alternatively or additionally, the actuation of a brake lever may be detected. A pressure sensor may be situated in a brake actuating device.

In addition, the selection of the stage may be based on the speed of the vehicle; for example, for a stationary vehicle the first stage may be selected. If the vehicle is moving, a classification of the hazard may thus be made based on the vehicle speed and/or acceleration and/or the change in the brake pressure generated by the driver or a change in the position of a brake actuating device. In addition, when a greater hazard is present, an ABS function of the vehicle brake may be activated if it is available. However, due to the improved distribution of the brake forces on the front and rear wheels, in many cases the response of an ABS system may be delayed compared to the generation of brake pressure by the driver. At least in the fifth stage, an ABS function or an ABS-like function may optionally be effectuated. The braking distance is thus optimized by an ideal utilization of the rear wheel brake and front wheel brake in combination. As the result of rapidly alternating influencing of the brake pressure by the brake force influencing device, for an active ABS-like function, the brakes likewise brake more intensely and less intensely in rapid alternation, thus preventing long-term locking of the wheels and loss of control over the vehicle.

In another specific embodiment of the method, the distribution of the total brake force on the front wheel and rear wheel brakes is carried out in such a way that neither of the brakes is locked. This may be achieved, for example, by ascertaining the weight of the driver based on data from an electric drive via the acceleration with electrical power. A suitable total brake force may be determined therefrom, so that in the case of an advantageous distribution of the brake forces on the front and rear wheels, the situation may be achieved that neither of the wheels is locked. In addition, via a classical ABS function it is possible for only temporary locking to take place.

In another specific embodiment, a brake force is corrected in the course of a braking operation. In particular, a brake pressure is increased in order to reduce the braking distance. By taking these measures during the course of the braking operation instead of setting the brake force distribution once, the braking operation may be flexibly adapted to events such as a changed base surface, changing traffic situations, or a changing course of the roadway, in particular with an uphill or downhill grade.

In another specific embodiment, a response is made to a decrease in the brake pressure at the front wheel by increasing the brake pressure at the rear wheel in order to compensate, preferably at least approximately, for the loss of brake force at the front wheel.

In another specific embodiment, when only one brake of the front wheel brake and rear wheel brake is actuated by the driver, the brake pressure control device also actuates the other of the two brakes. A higher total brake force is thus achieved, which results in a shorter braking distance and reduces the wear on the brakes and tires.

In another specific embodiment, a brake of one wheel is controlled in such a way that braking is carried out so intensely that a maximum possible friction between the wheel and the base surface is approximated. For this purpose, the brake pressure is increased enough that the wheel locks, whereupon the brake pressure falls once again, so that the wheel is released for a braked rotation. The control device quickly alternates between these two states, whereby "quickly" means that the change is carried out multiple times during a typical braking operation. The brake pressure at which the locking takes place is known to the brake pressure control device. The information may be obtained by a calibration, for example, in which the brake pressure is increased until the play is pressed out of the brake parts and the braking effect noticeably increases. It is also possible to deduce the locking brake pressure from this calibrated brake pressure, for example by modifying with the weight of the driver. The method according to this specific embodiment may be superimposed on a braking operation in order to preferably greatly shorten the braking distance. This is preferably carried out with a rapid pressure rise by quick actuation of the brake actuating device by the driver and/or when a hazardous situation is recognized. This may involve one or both wheels. If no hazardous situation is recognized, and thus a normal braking operation is present, the method according to this specific embodiment is preferably not carried out. The intervention into the braking system is thus limited to an improved distribution of the brake forces on the front and rear wheels.

In another specific embodiment of the method, the action of the brake force influencing device is prevented in the event of a power failure. This means that when there is a power failure, the brake forces generated by the driver are introduced into the distribution to the front and rear wheels in which the forces are generated by the driver. This may be achieved, for example, by providing a shut-off valve in each brake force influencing device, via which the brake force influencing devices may be hydraulically withdrawn from the braking system. The shut-off valves have a self-closing design, so that they interrupt the connection of the brake force influencing device to the braking system when a power failure is present.

In another aspect of the present invention, a braking device is provided which includes a separate brake actuation detector for the actuation of the front wheel brake actuating device and for the actuation of the rear wheel brake actuating device. The brake pressure control device is configured for receiving brake actuation information from the brake actuation detector, which is operatively connected to the brake actuating devices. The brake actuation information may in particular be information concerning the brake pressure, and may be encoded in particular in digital data or analog signals by brake pressure sensors. The brake pressure control device is also configured for distributing a total brake force on the front wheel brake and the rear wheel brake, the brake actuation information specifying the total brake force and the distribution of the brake force on the front wheel and the rear wheel. In addition, the brake pressure control device is configured for controlling the brake force influencing device according to the extent of the actuation ascertained for the front wheel brake and the rear wheel brake. The brake pressure control device is also configured for carrying out a distribution of the brake forces which differs from a distribution that is specified by the driver via the brake actuating devices.

The resulting advantages have been described above with regard to the method for braking a vehicle.

In one specific embodiment of the braking device, information from sensors is supplied to the brake pressure control device. In particular, these sensors involve a speed sensor, an acceleration sensor, a rotation rate sensor for detecting angular velocities or angular accelerations of the vehicle, an inclination sensor, and/or a sensor for a position of a brake actuating device. The speed sensor may be designed as a sensor which may detect the rotary position or a speed of a wheel of the vehicle. The information from one or multiple sensors is used by the brake pressure control device for ascertaining the distribution of a total brake force on the front and rear wheels.

In another specific embodiment of the braking device, the brake pressure influencing device includes one or multiple shut-off valves. The brake pressure influencing device may be disconnected from the brakes and the brake actuating device via these shut-off valves. If the electric power supply for the brake pressure influencing device fails, the shut-off valves may be used to prevent the brake pressure influencing device from changing the brake pressure that is specified via the brake actuating devices. The brake then functions in the conventional manner without assistance from the brake pressure influencing device. For this purpose, the shut-off valves have a self-closing design; i.e., a hydraulic separation is effectuated when no electrical energy is available.

In another specific embodiment of the braking device, the braking device includes a pressure generation device which may deliver or receive brake fluid. The pressure generation device is connected to the portion of the braking device that is filled with brake fluid, so that a change in volume of the pressure generation device acts as an actuation of the brake actuating device. When the volume of the pressure generation device increases, brake pressure is thus withdrawn from the system, while the brake pressure is increased when the volume of the pressure generation device is decreased. A separate pressure generation device for a front wheel and for a rear wheel is present in the brake pressure influencing device, so that the brake force of the wheels is influenceable independently of one another.

In another specific embodiment of the braking device, the braking device is a combination of a conventional ABS system and a braking device according to one of the specific embodiments described above.

All specific embodiments of a braking device described above may be configured for carrying out a specific embodiment of the above-described method.

BRIEF DESCRIPTION OF THE DRAWINGS

Exemplary embodiments of the present invention are described in greater detail below with reference to the figures.

DETAILED DESCRIPTION OF EXAMPLE EMBODIMENTS

Figure 1:
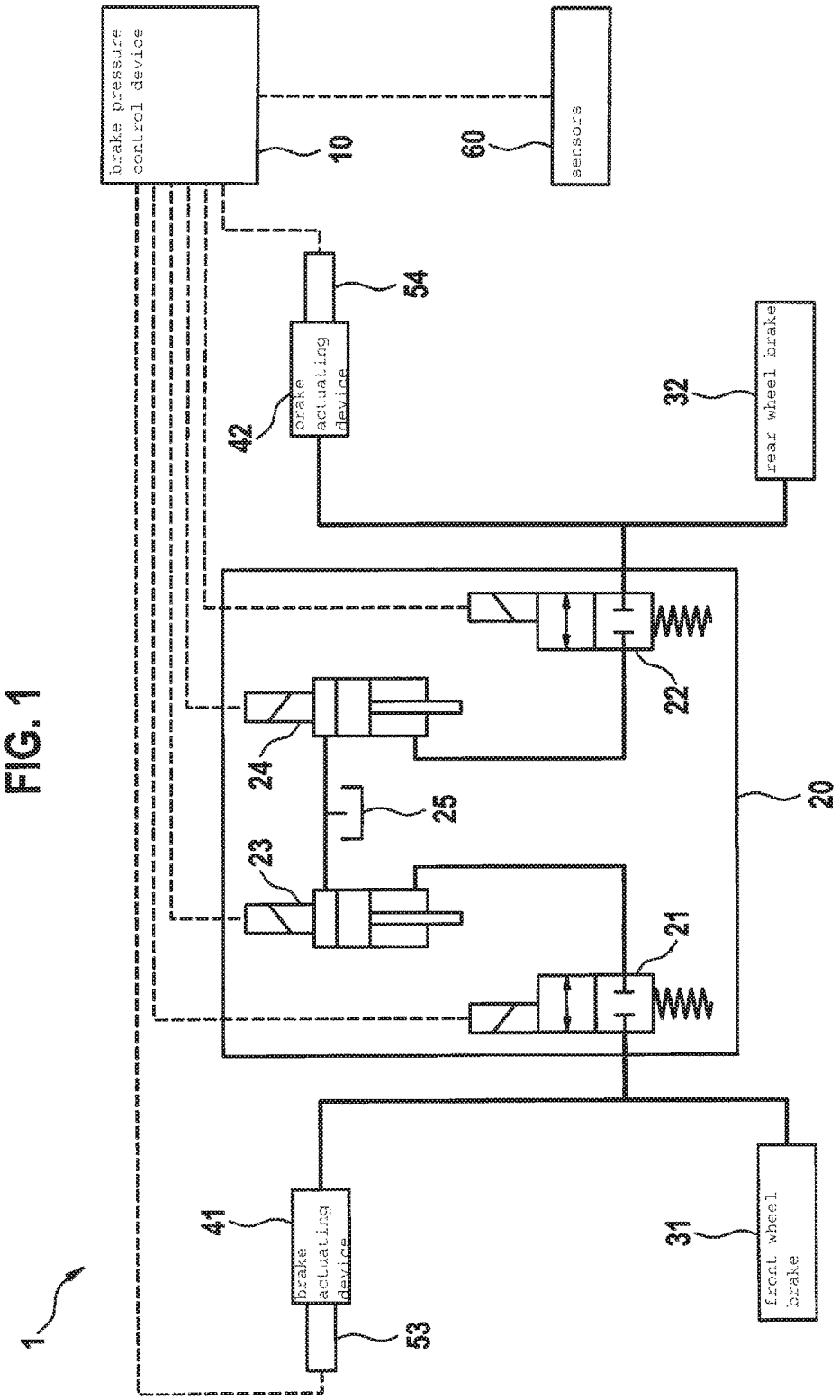
FIG. 1 shows a schematic circuit diagram of the braking device in a first specific embodiment.

FIG. 1 shows a schematic illustration of a braking device 1 as a hydraulic-electrical circuit diagram. Braking device 1 includes a front wheel brake 31 and a rear wheel brake 32 which are each actuatable by a driver with the aid of a brake actuating device 41 and 42, respectively. Brake actuating devices 41, 42 are each designed as a hydraulic pressure generator which includes a cylinder and a piston. Brake actuating devices 41, 42 include a brake actuation measuring device 53, 54, respectively, as a brake actuation detector, which in the specific embodiment in FIG. 1 each generate a signal which corresponds to the relative position of the particular piston in the particular cylinder, or to a particular position of an actuating lever or an actuating pedal. The signals of brake actuation measuring device 53 or 54 are led to a brake pressure control device 10, which detects the extent of the actuation of front wheel brake 31 and of rear wheel brake 32. Brake pressure control device 10 is also connected to one or multiple additional sensors 60, illustrated in FIG. 1 as a single block. Further relevant operating parameters of the vehicle in which braking device 1 is installed may be detected with the aid of these sensors 60. These are in particular parameters which involve the instantaneous driving state, such as speed, acceleration, inclination, rotation rate, and/or wheel position.

Braking device 1 also includes a brake force influencing device 20, which includes a shut-off valve 21 and 22 and a pressure generation device 23 and 24 for the front wheel brake and the rear wheel brake, respectively. Shut-off valves 21 and 22 are hydraulically connected to the brake circuit for front wheel brake 31 and rear wheel brake 32, respectively, and may disconnect the portion of brake force influencing device 20 which is part of front wheel brake 31 or rear wheel brake 32 from the particular brake circuit. Shut-off valves 21 and 22 are electromagnetically controllable, and for this purpose are each connected to brake pressure control device 10. Shut-off valves 21 and 22 are self-locking valves; i.e., in the event of a failure of the electric power supply, shut-off valves 21 and 22 go into a closed position. As a result, brake force influencing device 20 is hydraulically disconnected from the brake circuits when such a failure is present. The hydraulic brake circuits of front wheel brake 31 and of rear wheel brake 32 are then manually operable in the conventional manner with the aid of brake actuating devices 41 and 42. When shut-off valves 21 and 22 are switched to the open position, the brake circuits of front wheel brake 31 and of rear wheel brake 32 are connected to their respective pressure generation device 23 and 24. These pressure generation devices 23, 24, as illustrated, may be piston-cylinder systems which are actuatable electromagnetically, for example by an electric motor or an electromagnetic coil; the cylinders of the piston-cylinder system are connected to associated shut-off valve 21 or 22, whereby the pressure in a brake circuit may be increased or decreased with the aid of more or less intense force on the piston in the direction of the brake fluid in the cylinder. Alternatively, piezo actuators, thermal actuators, or electrochemical actuators which may effectuate a change in volume or increase in pressure in the pressure generation devices may be used. Larger or smaller brake forces on brakes 31, 32 correspondingly result. If a deficit or an excess of brake fluid is present in pressure generation devices 23, 24, brake fluid may be stored in a tank 25. A process takes place in brake pressure control device 10, via which the brake force desired by the driver may be distributed on front wheel brake 31 and rear wheel brake 32 with the aid of pressure generation devices 23 and 24. Brake pressure control device 10 does not necessarily have to be an independent or single unit, and instead may have a subdivided design and/or may be part of some other control device, for example an engine control system.

Figure 2:
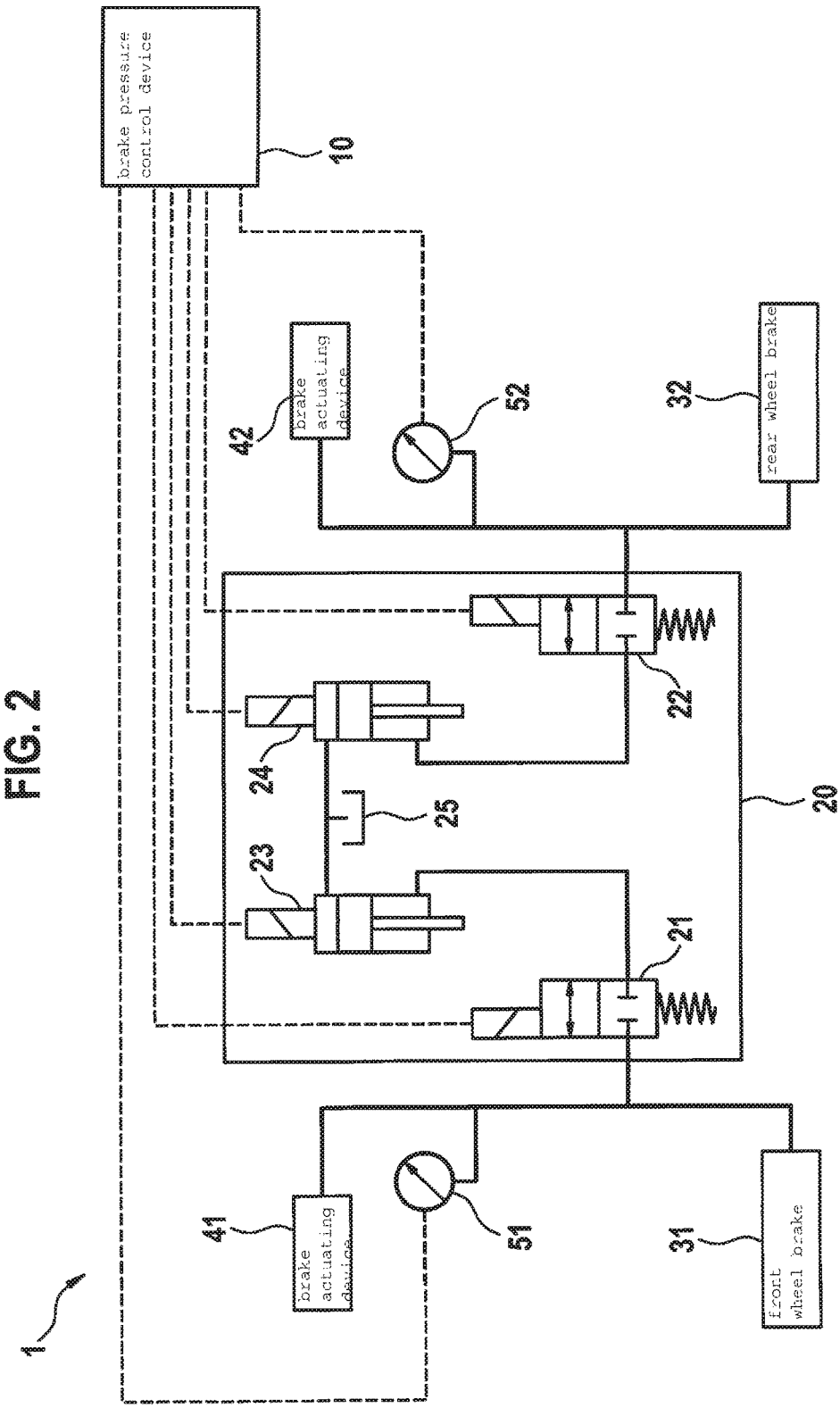
FIG. 2 shows a schematic circuit diagram of a second specific embodiment of the braking device.

FIG. 2 shows a schematic illustration of a second specific embodiment of braking device 1 as a hydraulic-electrical circuit diagram. The second specific embodiment is largely the same as the first specific embodiment, so that only differences from the first specific embodiment are described below. With regard to the identical features, reference is made to the description for FIG. 1. The second specific embodiment differs from the first specific embodiment in that, instead of a brake actuation measuring device 53, 54 for front wheel brake 31 and rear wheel brake 32, respectively, a brake pressure measuring device 51 or 52 is situated in each of the brake circuits. Brake pressure measuring devices 51, 52 may be situated directly at brake actuating device 41, 42, for example a brake handle or a brake pressure sensor cylinder. Brake pressure measuring devices 51, 52 transmit signals regarding the brake pressures generated by the driver to brake pressure control device 10. Thus, the brake pressure control device does not interpret the braking intent based on the extent of the actuation of an actuating device, as in the specific embodiment in FIG. 1, but, rather, based on the pressure that has been built up by actuating devices 41 and 42.

Figure 3:
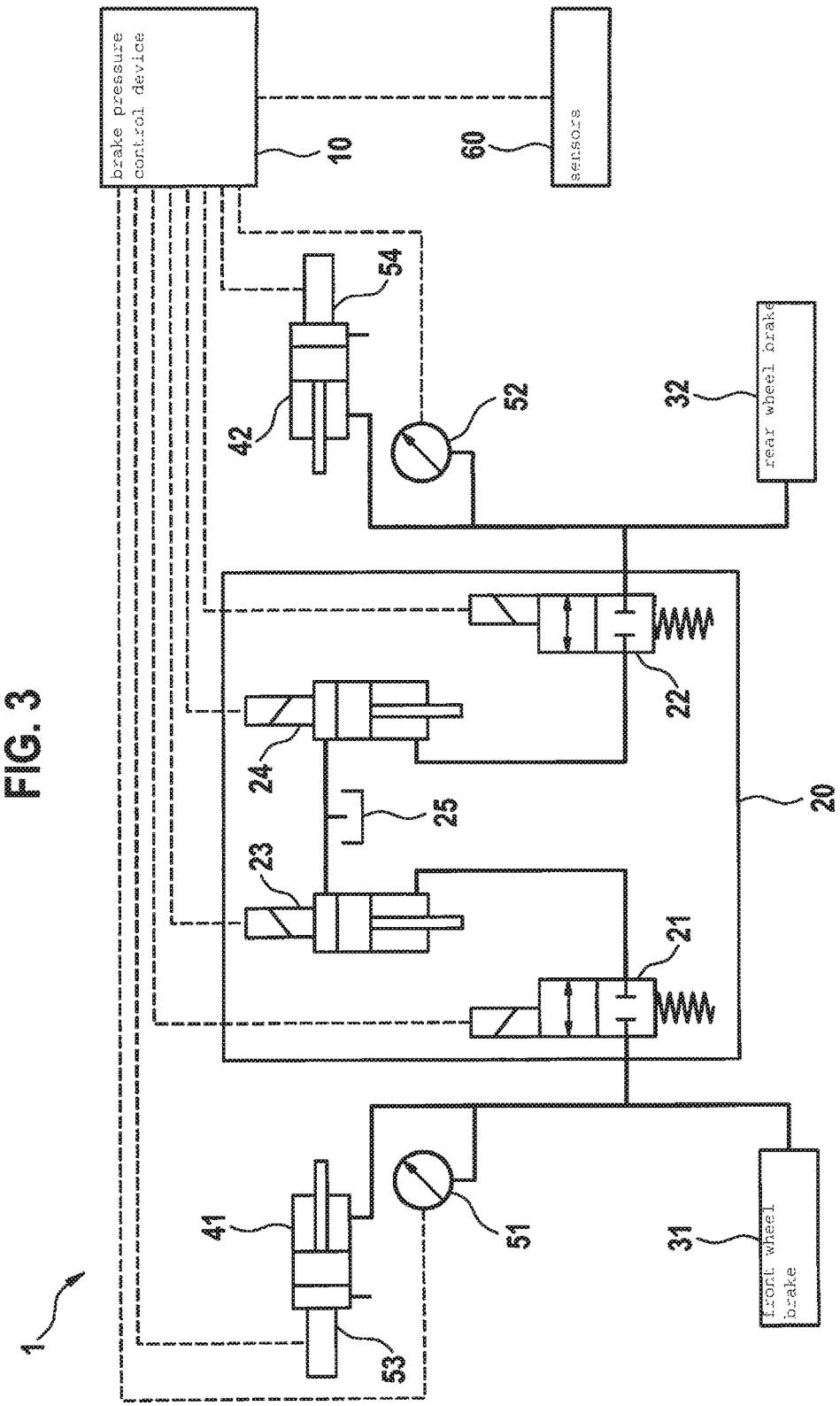
FIG. 3 shows a schematic circuit diagram of a third specific embodiment of the braking device.

FIG. 3 shows a schematic illustration of a third specific embodiment of braking device 1 in a hydraulic-electrical circuit diagram. The third specific embodiment is largely the same as the first specific embodiment, so that only differences from the first specific embodiment are described below. With regard to the identical features, reference is made to the description for FIG. 1. In contrast to FIG. 1, the third specific embodiment additionally includes pressure measuring devices 51 and 52, already described with reference to FIG. 2. Brake pressure control device 10 in the third specific embodiment may thus deduce the braking intent of the driver from the extent of the actuation of an actuating device 41 or 42, and also from the pressures built up with the aid of brake actuating devices 41 and 42, or from both.

Figure 4:
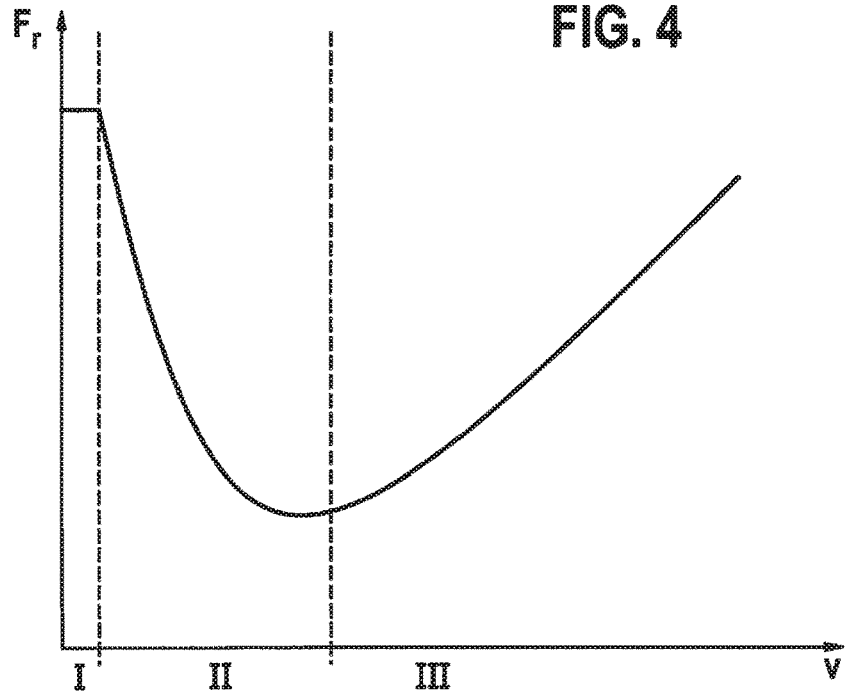
FIG. 4 shows a schematic diagram for explaining the friction states between the wheel and the roadway.

FIG. 4 shows a diagram, illustrating a Stribeck curve by way of example, in which a friction force $F_R$ is depicted on the ordinate as the function of a friction speed v. Static friction, in which a high coefficient of friction is present, is present in a first speed range I. In typical cases, this also corresponds to the rolling friction between a wheel and a roadway. Sliding takes place in a friction speed range II, in which the coefficient of friction decreases significantly with friction speed. The coefficient of friction once again increases with friction speed in a third range III at a yet higher friction speed. It may thus be deduced that the highest deceleration levels may be achieved when the rolling friction is maintained, instead of transferring the braking operation into sliding friction.

Figure 5:
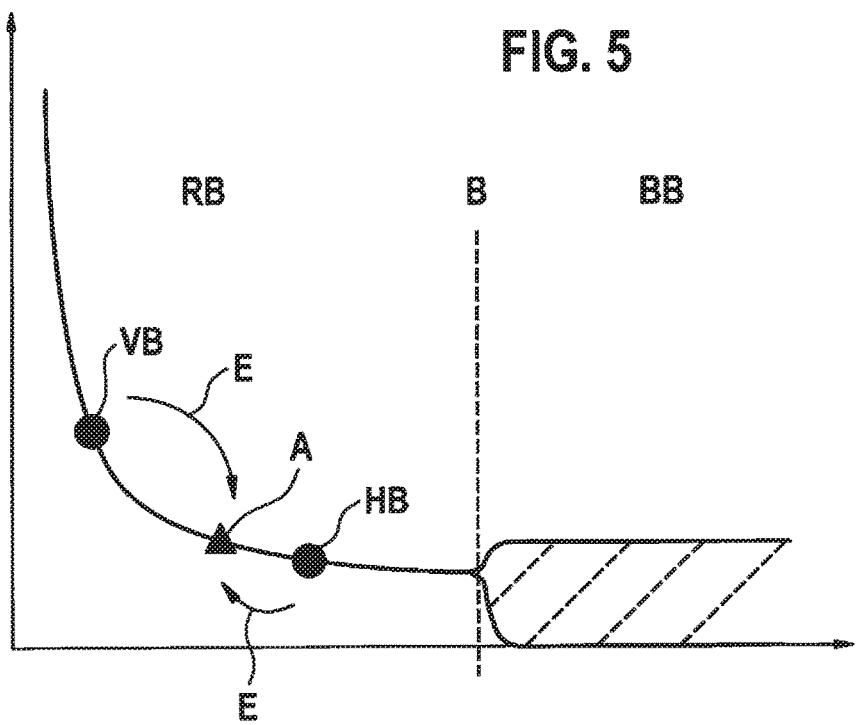
FIG. 5 shows a schematic diagram for explaining the influencing of brake forces at a front wheel and a rear wheel.

FIG. 5 schematically shows a diagram in which the braking distance of a vehicle is indicated on the ordinate, and the intensity of actuation of a brake actuating device is indicated on the abscissa. A curve is obtained which is divided by a locking boundary B into a rolling friction range RB and a locking range BB, rolling friction range RB being situated between locking boundary B and the ordinate. FIG. 5 illustrates by way of example a braking operation in rolling friction range RB, in which the braking state of the front wheel brake is illustrated as a point VB, and the braking state of the rear wheel brake is illustrated as a point HB, on the curve. The location of points VB and HB is determined by the intensity of the actuation of the brake actuating devices by the driver of the vehicle. The location of points VB and HB on the curve may be influenced by an intervention E by the braking device. In the specific embodiment shown in FIG. 5, the intervention takes place in that the brake force at the less intensely braked brake, in this case the front wheel brake, is increased, and the brake force at the more intensely braked brake, in this case the rear wheel brake, is decreased. This takes place in such a way that the total brake force of both brakes is essentially maintained. A point A on the curve, depicted as a triangle, is obtained which represents an adapted braking state for both brakes. By reducing the brake force of the more intensely braked brake, in this case the rear wheel brake, the tendency of this brake to lock, as well as wear on the brake, is reduced. During full braking, triangular point A is optimally situated in rolling friction range RB and in the direction of the ordinate, directly next to locking boundary B, which represents the maximum possible deceleration. In locking range BB, which is situated on the side of locking boundary B facing away from the ordinate, the curve is illustrated with a broader shape, since how the braking distance responds in the event of wheel locking cannot be unequivocally stated. This is a function of speed, among other variables.

Figure 6:
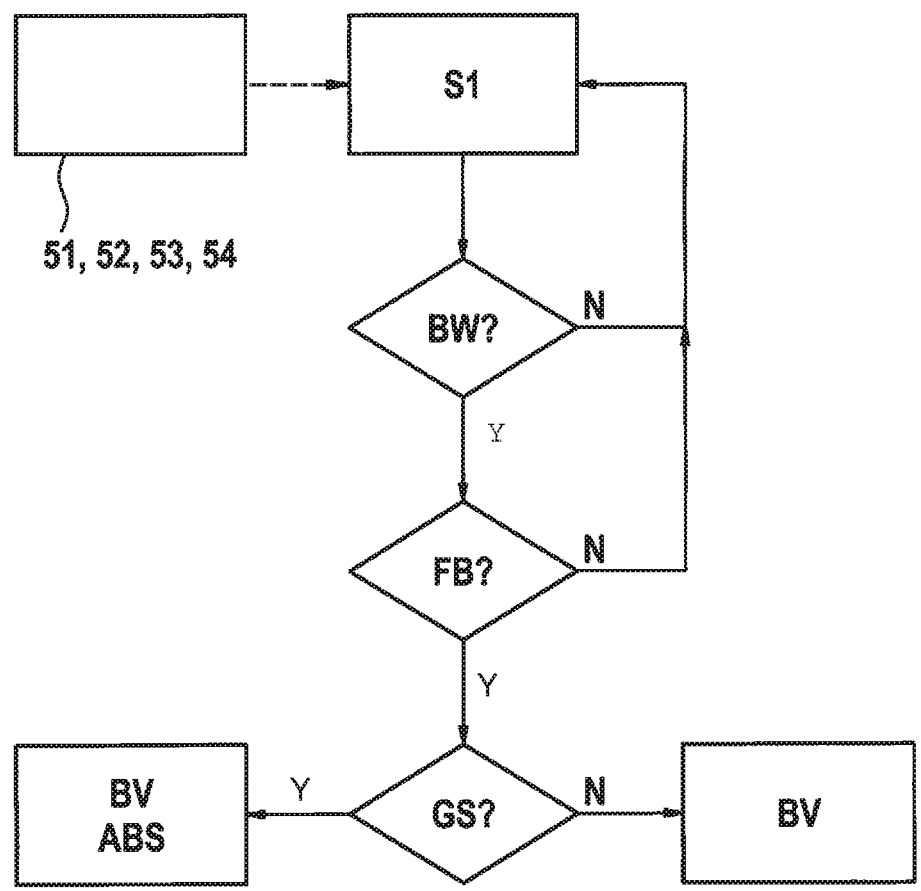
FIG. 6 shows a schematic flow chart of a method for braking a vehicle.

FIG. 6 schematically depicts a flow chart which illustrates by way of example an operation of the braking device or a sequence of a method for braking a vehicle. Information concerning a braking intent is received from the driver via the brake actuation measuring device. For this purpose, the driver actuates the brake actuating device. This results in increased pressure in the hydraulic circuit of the front wheel brake and/or the rear wheel brake. The brake actuation detector includes pressure sensors and/or sensors for mechanically moving the brake actuating device, which generate appropriate electrical signals and relay them to the brake pressure control device. These signals are prepared, processed, and analyzed in the brake pressure control device, and the brake pressure influencing device is controlled based on the received signals. In addition, further units of the vehicle, such as a motor, a human-machine interface, or other control units may be informed, and/or information may be obtained from these entities. The brake pressure control device evaluates the signals or information in a step S1 in such a way that it determines whether the driver has a braking intent BW. If braking intent BW is not present, no control of the pressure generation devices is carried out, and the method continues with step S1; i.e., additional signals or information are/is evaluated.

If a braking intent BW, i.e., an actuation of the brake actuating device, for example, has been established, it is determined, based on further sensors such as a speed sensor, an acceleration sensor, a rotation rate sensor, an inclination sensor, or a wheel motion sensor, whether or not vehicle movement FB is present. If no vehicle movement FB is present, an intervention into the braking operation is not necessary, and the process is continued with step S1 and new signals from the brake actuation measuring device are evaluated. If vehicle movement is present, the process switches to a determination of whether or not a hazardous situation GS is present. In the specific embodiment illustrated, no hazardous situation GS is present, and a braking operation BV is carried out in which the brake forces generated by the driver are not changed, or are changed in such a way that an appropriate brake force is present at the front wheel and at the rear wheel. In some cases, this brake force may be the same for the front wheel and the rear wheel.

Whether a hazardous situation GS is present may be ascertained, for example, utilizing the above-mentioned sensors with regard to the driving situation. If the vehicle is in motion, a decision is made based on the speed, the acceleration, a sharp rise in the brake pressure, and/or the extent of the actuation of the brake actuating device whether or not a hazardous situation GS is present. For example, if no vehicle speed is present and the brake is actuated, the brake pressure control device may conclude that a hazardous situation is not present, even if the brake is actuated to an extent that would result in locking of the wheels during travel. For example, the driver may actuate the brake when stopped at a traffic light. In principle, if no vehicle speed is present, an intervention into the braking response with the aid of the brake force influencing device may be dispensed with.

If a hazardous situation GS has been recognized, the brake pressure control device carries out a braking operation BV with adapted brake forces at the front wheel and the rear wheel, and with a superimposed ABS-like function. Likewise, if a hazardous situation GS is not present, the brake forces at the front wheel and the rear wheel are appropriately changed, in particular to shorten the braking distance during a braking operation BV.

For a conventional ABS function which is implemented at the same time, using the present invention, instead of an ABS-like function the conventional ABS may be activated when a hazardous situation GS has been recognized. The intervention by the ABS function may be delayed due to an improved distribution of the brake forces on the front wheel and rear wheel. If no hazardous situation GS is initially determined in the course of a braking operation, but a hazardous situation GS is subsequently determined, after the hazardous situation GS is established the braking may be carried out using the ABS-like function, or, if present, the conventional ABS function. In the process, the braking distance is optimized by ideal utilization of the braking capability by the rear wheel and front wheel brakes in combination.

An overview of the hazards for various combinations of the actuation intensity of a front wheel brake and a rear wheel brake is provided in the following table.

|  |  | Front wheel brake | | |
| --- | --- | --- | --- | --- |
|  |  | Low | Average | High |
| Rear wheel brake | Low | long braking distance no hazardous situation | average braking distance low-hazard situation | average braking distance high-hazard situation for a collision |
|  | Average | average braking distance no hazardous situation | average braking distance low-hazard situation | short braking distance hazard of a collision and locking of the rear wheel |
|  | High | average braking distance hazard of locking of the rear wheel | short braking distance hazard of locking of the rear wheel and a rollover | short braking distance high-hazard situation for a collision and locking of the rear wheel |

There is little hazard when a combination of a low or average brake force at the front wheel brake and the rear wheel brake is present. A braking situation in need of improvement is present when there is a high braking effect at the rear wheel and a low or average braking effect at the front wheel.

Figure 7:
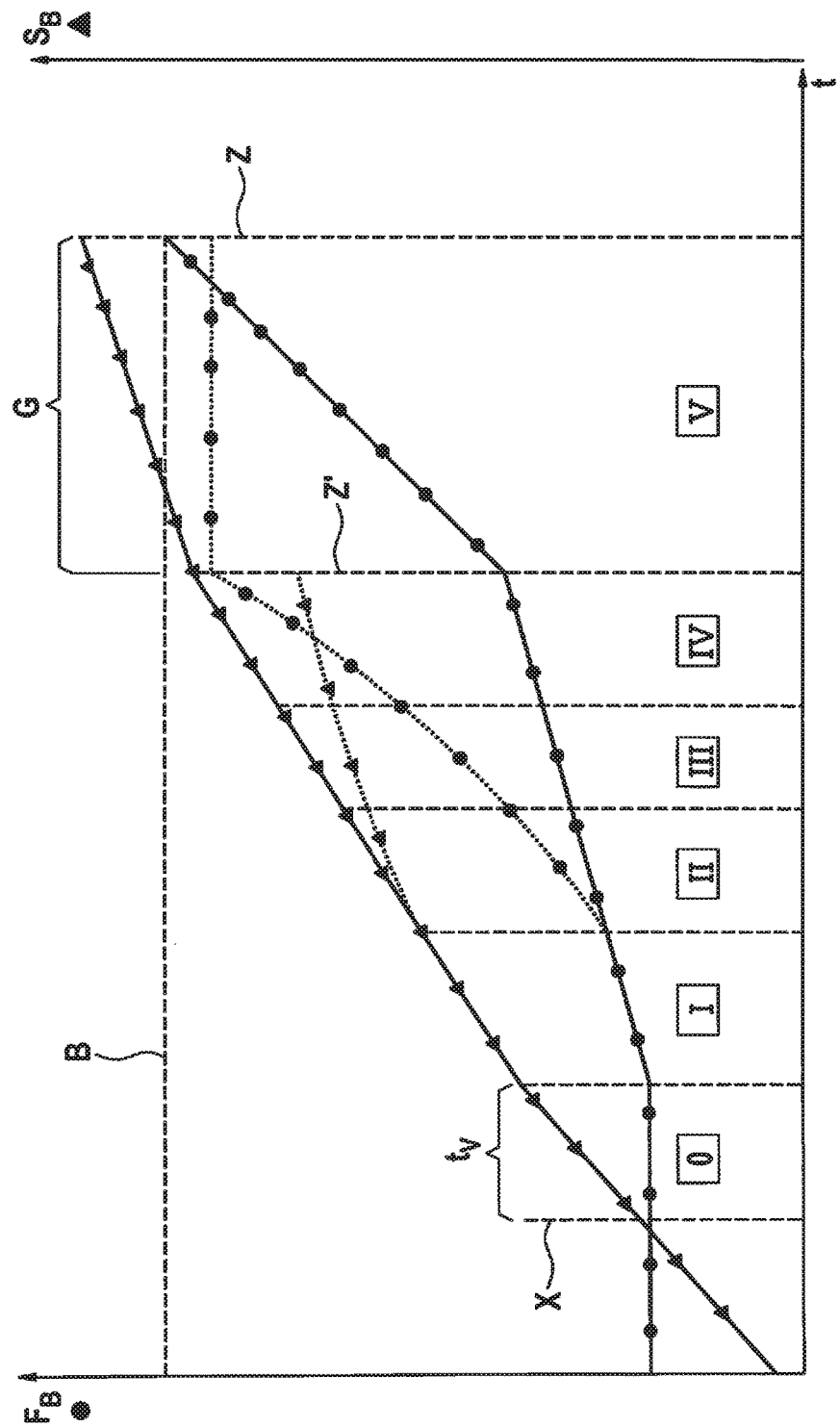
FIG. 7 shows a schematic diagram of braking phases during a braking operation.

FIG. 7 schematically shows a diagram in which braking operations are plotted as graphs. In the diagram a total brake force $F_B$ is plotted on the ordinate, while time t of the braking operation is depicted on the abscissa. An additional ordinate on which braking distance $s_B$ is plotted is illustrated at the right end of the abscissa. The curves in the diagram associated with the ordinate for total brake force $F_B$ are marked with small circles, while curves associated with the ordinate for braking distance $s_B$ are marked with small triangles. The points and triangles are used solely for marking the curves. Parallel to the abscissa, a locking boundary B is plotted as a dashed line. The illustrated braking operation is divided into six sections in the direction of the abscissa, each denoted by Roman numerals in rectangular boxes. At a point in time X, depicted by a dashed line in parallel to the ordinate, an event occurs which results in triggering of the braking operation. The response to the event by the driver, which lasts for deceleration time $t_v$, takes place during phase 0. Beginning with phase I, the brakes of the vehicle exert a total brake force $F_B$. The solid lines for total brake force $F_B$ and braking distance $s_B$ in each case represent the pattern of the braking operation without intervention by the brake force influencing device, and thus correspond to conventional braking by a driver. In the illustrated case, total brake force $F_B$ continuously increases over the course of phases I through IV. Since the vehicle does not immediately come to a stop, it moves along the braking distance, which is schematically illustrated by the solid line marked with triangles. At the start of phase V, the driver increases the rise in total brake force $F_B$, as the result of which it rises significantly more sharply than in phases I through IV. It may thus be deduced that a hazardous situation G, for example an imminent collision, is present during phase V. Correspondingly, the vehicle moves with increasing deceleration along braking distance $s_B$, which is schematically illustrated by the flatter curve of the solid line marked with triangles. This braking distance curve ends at dotted line Z, which is plotted in parallel to the ordinates in the diagram. At this point, the vehicle is stopped and the conventional braking operation is concluded.

The two dotted lines illustrate how total brake force $F_B$ and braking distance $s_B$ change under the influence of the brake force influencing device. A braking operation without intervention by the brake force influencing device takes place during phase I. During this phase, the brake pressure control device ascertains which braking effect the driver has effectuated in each case for the front wheel and the rear wheel. In phase II, the brake pressure control device begins to influence and optimize the brake pressure in the front wheel and/or the rear wheel. Low-intensity influencing is initially effectuated in phase II. As a result, total brake force $F_B$ increases slightly, as shown by the curve of the dotted brake force line marked by circles. Accordingly, the pattern of braking distance $s_B$ as a dotted line marked by triangles deviates from the solid line of the braking distance curve with no influence, marked by triangles. Braking distance $s_B$ is shortened due to more intense total brake force $F_B$. The influence is increased and the brake force increases more sharply in phase III. Accordingly, the curve of the dotted line for the braking distance is also flatter. The brake force influencing device effectuates an even more intense increase in total brake force $F_B$ during phase IV, which causes even more marked flattening of the curve for braking distance $s_B$. The flatter curve also means a sharper reduction in speed, resulting in the vehicle already coming to a stop at point in time Z', namely, at the transition between phases IV and V. Point in time Z' is chronologically before point in time Z, at which the vehicle comes to a stop without the intervention by the brake force influencing device. In some cases, a hazardous situation may be mitigated—for example, a collision may be avoided—due to the braking distance which is shortened in this way. The occurrence of a hazardous situation G in phase V may be avoided due to the fact that the vehicle is already stopped at point in time Z'.

What is claimed is:

1. A method for braking a vehicle, the vehicle being an electric bicycle, the vehicle including a front wheel, a rear wheel, a hydraulic front wheel brake and a hydraulic rear wheel brake, the method comprising:

changing, using an electrohydraulic brake force influencing device, at least one of: i) a brake pressure of the front wheel brake effectuated by a driver of the vehicle via a front wheel brake actuating device, and ii) a brake pressure of the rear wheel brake effectuated by a driver of the vehicle via a rear wheel brake actuating device, wherein during a braking operation, the brake force influencing device is controlled by an electric brake pressure control device, and during the braking operation, the brake force influencing device increases and/or decreases at least one of the brake pressure of the front wheel brake, and the brake pressure of the rear wheel brake;

wherein the brake pressure control device receives brake pressure signals from a brake actuation detector for the front wheel and for the rear wheel brake, and implements a distribution of a total brake force across the front wheel and the rear wheel that is different from a distribution of the total brake force that is effectuated by the driver, the driver effectuating the distribution of the total force via actuation of at least one of the front wheel brake actuating device and the rear wheel brake actuating device; and locking one of the front wheel or the rear wheel, and subsequently releasing for rotation the locked one of the front wheel or rear wheel, the brake pressure control device controlling the brake force influencing device to perform the locking and the subsequent releasing multiple times in succession during a single braking operation.

2. The method as recited in claim 1, wherein the distribution of the total brake force is carried out according to stored information, the stored information being stored in the brake pressure control device.

3. The method as recited in claim 1, wherein information from at least one of a speed sensor, an acceleration sensor, a rotation rate sensor, an inclination sensor, and a sensor for a position of a brake actuating device, is taken into account in the distribution of the total brake force.

4. The method as recited in claim 1, wherein a braking operation is divided into multiple different influencing stages as a function of a brake pressure at the front wheel, the stages including: (i) a stage in which no influencing of the brake pressure at the front wheel takes place, (ii) stages in which the brake pressure at the front wheel is influenced with various levels of intensity the brake force influencing device, and (iii) the brake pressure at the front wheel is held constant, at least on average, regardless of an effectuation of a higher brake pressure by the driver.

5. The method as recited in claim 1, wherein the brake force influencing device increases a brake pressure to reduce the braking distance.

6. The method as recited in claim 1, wherein for a reduction of the hydraulic brake pressure of one of the front wheel brake or the rear wheel brake, the hydraulic brake pressure of the respective other wheel brake is increased, so that the total brake force is at least approximately as great as the total brake force prior to the reduction of the brake pressure.

7. The method as recited in claim 1, wherein in the event of actuation of only one of the front wheel brake or the rear wheel brake, the respective other wheel brake is also actuated by the brake pressure control device.

8. The method as recited in claim 1, wherein an action of the brake force influencing device on the brake pressure is prevented upon a power failure.

9. An electrohydraulic braking device for a vehicle, wherein the vehicle is an electric bicycle having a front wheel and a rear wheel, the electrohydraulic braking device comprising:
- a hydraulic front wheel brake;
- a hydraulic rear wheel brake;
- a brake actuating device for the front wheel brake, and a brake actuating device for the rear wheel brake, each of the brake actuating device for the front wheel device and the brake actuating device for actuation by a driver of the vehicle;
- an electrohydraulic brake force influencing device for at least one of increasing and decreasing a brake pressure of at least one of the front wheel brake and a brake pressure of the rear wheel brake, and for at least one of increasing and decreasing a brake force of at least one of the front wheel brake and the rear wheel brake;
- an electric brake pressure control device via which the brake force influencing device is controllable;
- a brake actuation detector to detect the actuation of the front wheel brake and of the rear wheel brake in each case;
- wherein the brake pressure control device is configured to receive brake pressure information from the brake actuation detection devices and to distributing the total brake force on at least one of the front wheel brake and the rear wheel brake based on signals from the brake actuation detector, and to control the brake force influencing device, the brake pressure control device implementing a distribution of the total brake force across the front wheel and the rear wheel of the vehicle that differs from the distribution of the total brake force that is effectuated by the driver via the brake actuating devices, the driver effectuating the distribution of the total force via actuation of at least one of the brake actuating device for the front wheel brake and the brake actuating device for the rear wheel brake;
- wherein the brake pressure control device controls the brake force influencing device to lock one of the front wheel or the rear wheel, and subsequently release for rotation the locked one of the front wheel or rear wheel, the brake pressure control device controlling the brake force influencing device to perform the lock and the subsequent release multiple times in succession during a single braking operation.

10. The braking device as recited in claim 9, wherein information from at least one of a speed sensor, an acceleration sensor, a rotation rate sensor, an inclination sensor, and a sensor for ascertaining a position of a brake actuating device is suppliable to the brake pressure control device for ascertaining the distribution of a total brake force on the front wheel brake and the rear wheel brake.

11. The braking device as recited in claim 9, wherein the brake pressure influencing device includes an electrically actuated shut-off valve, via which the brake pressure influencing device is hydraulically disconnectable from the front wheel brake and the rear wheel brake, and the brake actuating devices.

12. The braking device as recited in claim 9, wherein the brake pressure influencing device includes a pressure generation device for the front wheel and for the rear wheel which is one of electromagnetically, piezoelectrically, thermally, or electrochemically actuatable, and which is connected to a brake fluid of the front wheel brake or the rear wheel brake, and via which the brake pressure may be influenced, the pressure generation device being at least one of a displaceable piston in a cylinder, or an expandable and/or contractible element.

13. The braking device as recited in claim 9, wherein the brake pressure control device is a central control electronics system or a human-machine interface electronics system.

14. The braking device as recited in claim 9, wherein the braking device is configured to:
- change, using the electrohydraulic brake force influencing device, at least one of: i) the brake pressure of the front wheel brake effectuated by the driver of the vehicle via the front wheel brake actuating device, and ii) the brake pressure of the rear wheel brake effectuated by the driver of the vehicle via the rear wheel brake actuating device, wherein during a braking operation, the brake force influencing device is controlled by the electric brake pressure control device, and during the braking operation, the brake force influencing device increases and/or decreases at least one of the brake pressure of the front wheel brake, and the brake pressure of the rear wheel brake.

* * * * *